Jan. 3, 1961 | H. W. FAEBER | 2,966,848

EXPANDABLE BASE PLATE

Filed May 7, 1958 | 3 Sheets-Sheet 1

INVENTOR.
HARRY W. FAEBER

BY

Brumbaugh, Free, Graves & Donohue
ATTORNEYS.

Jan. 3, 1961 H. W. FAEBER 2,966,848
EXPANDABLE BASE PLATE
Filed May 7, 1958 3 Sheets-Sheet 2

INVENTOR.
HARRY W. FAEBER
BY
Brumbaugh, Free, Graves & Donohue
ATTORNEYS.

Jan. 3, 1961 H. W. FAEBER 2,966,848

EXPANDABLE BASE PLATE

Filed May 7, 1958 3 Sheets-Sheet 3

INVENTOR.
HARRY W. FAEBER

BY

Brumbaugh, Free, Graves & Donohue

ATTORNEYS.

United States Patent Office 2,966,848

Patented Jan. 3, 1961

2,966,848

EXPANDABLE BASE PLATE

Harry W. Faeber, Larchmont, N.Y., assignor to Time, Incorporated, New York, N.Y., a corporation of New York Filed May 7, 1958, Ser. No. 733,524

8 Claims. (Cl. 101—415.1)

This invention relates to base plates for mounting on the plate cylinders of printing presses and, more particularly, to expandable base plates to support printing plates on presses.

With the development of the nylon printing plate, it became the practice to combine the nylon facing directly to the base plate. This base plate, being substantially thick and containing an appreciable quantity of metal, should preferably be removed after the printing operation for reuse with other nylon printing plates. However, several obstacles have developed in this practice. For example, the base plate is trimmed and grooved in register with the printing image, and the trimming allowance is lost in the first use of the base plate, making reuse impractical. Thus, the expensive trimming and grooving operation must be repeated for each plate made. Other disadvantages include the damage to the nylon printing surface and the resulting loss of the printing plate for future reprints. In addition, the time required to salvage metallic base plates for their scrap value represents nonproductive hours that could be put to better use elsewhere.

To provide a relatively thin metal backing has been found to be satisfactory for supporting the nylon printing surface, but distortions are developed when it is clamped in the bed of a printing press. Therefore, an object of this invention is to provide a base plate to which a nylon printing plate having a relatively thin metallic backing may be mounted for attachment to a printing press.

Another object of the invention is to provide a new and improved base plate to overcome the disadvantages mentioned above.

Still another object of the invention is to provide a base plate to which a plastic printing plate may be mounted for attachment to a printing press without deforming the plastic plate.

Yet another object of the invention is to provide means for adapting thin, flexible metal-backed plastic plates to conventional tension lock-up plate cylinders originally designed for the much thicker rigid plate.

Generally, a base plate according to the invention provides a means for receiving a plastic printing plate and a means for attaching the base plate to a printing press. The unique features of construction of the base plate permit the force applied to the plastic printing plate to be uniform regardless of any unbalance in the forces acting on the base plate.

For a more complete understanding of these and other objects of the present invention, reference may be had to the description which follows and to the accompanying drawings in which.

Figure 1:
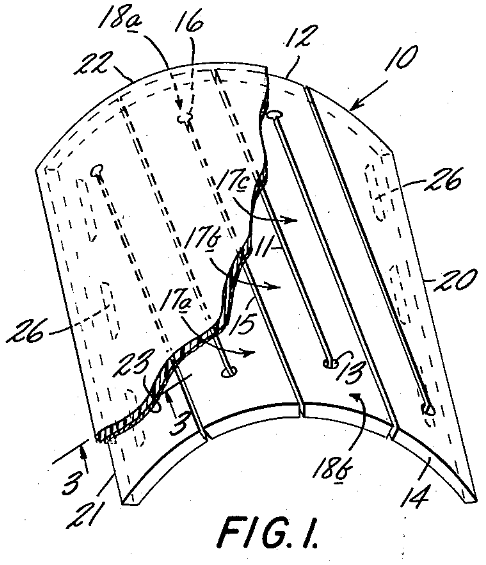
Figure 1 is a perspective view of one form of a base plate constructed according to the invention for mounting on a rotary-type printing press.
Figure 2:
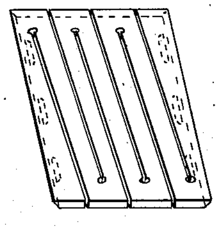
Figure 2 is a perspective view of a base plate similar to that shown in Figure 1 and adapted to be mounted on a flat bed type of printing press.

Referring now in detail to Figure 1 of the drawings, a base plate 10 is formed of a plurality of sections attached to each other to provide a unitary, expandable base plate. The various sections of the base plate 10 are formed, in this embodiment of the invention, by a plurality of slots extending, alternately, from one end of the base plate to an aperture located adjacent the opposite end. For example, a slot 11 extends from the curved end 12 to an aperture 13 located adjacent the curved end 14. A slot 15, adjacent the slot 11, extends from the curved end 14 to an aperture 16. By this construction, sections 17*a*, 17*b* and 17*c* are connected by solid portions 18*a* and 18*b* to permit the base plate 10 to be expandable under the action of a force applied along the opposite edges 20 and 21. Of course, the number of slots in the base plate 10 may be other than the specific number shown in Figure 1 to give the plate any desired amount of expandability, and the base plate 10 may be formed with any desired radius of curvature. Actually, the base plate 10 may be adapted to fit a flat bed type of printing press by a construction as shown in Figure 2.

Figure 3:
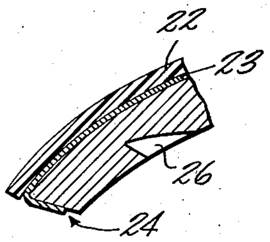
Figure 3 is a view in cross-section taken along the line 3—3 in Figure 1.
Figure 4:
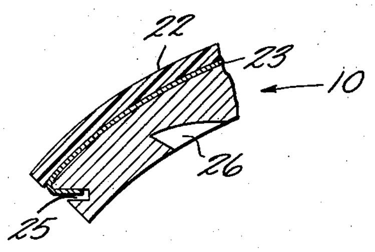
Figure 4 is a cross-sectional view similar to that shown in Figure 3 but showing a modified edge for attaching a printing plate.

Each of the edges 20 and 21 is beveled to an angle of approximately 30 degrees with a plane perpendicular to the surface of the base plate 10. These beveled edges provide a means for mounting a laminated plastic printing plate 22 and a metallic backing plate 23 to the base plate 10. As shown in Figure 3, the relatively thin metallic backing plate 23 is provided with ends which are bent to fit the beveled edges of the base plate 10, as indicated by the numeral 24. It has been found that this type of clipped end mounting 24 is satisfactory for a mounting plate 23 having a thickness of approximately .015 inch or more. For thicknesses of the plate less than approximately .015 inch, there is a tendency for the clipped end 24 to open, resulting in loosening the printing plate 22. By providing a slot 25 on each of the edges 20 and 21, as seen in Figure 4, mounting plates 23 having thicknesses less than .015 inch can be held more effectively by the base plate 10.

Along the underside of the base plate 10 adjacent each of the edges 20 and 21, a plurality of under-locking grooves 26 are spaced apart to provide means to receive under-locking hooks for attaching the base plate 10 to a suitable printing press. The metallic backing plate 23, with the plastic printing plate 22 laminated thereto, is preformed to a dimension between bent-over ends 24, which dimension will at best vary slightly from plate to plate. By providing a discontinuous backing plate 10 having interconnected sections, the edges 20 and 21 are movable relative to each other first to allow placing the printing plate over the backing plate, and then to properly hold the printing plate upon the tightening of the lock-up hooks in the grooves 26. The clamping mechanism for mounting the base plate 10 to the printing cylinder is shown and described in Faeber Patent No. 2,621,590, granted December 16, 1952.

Figure 5:
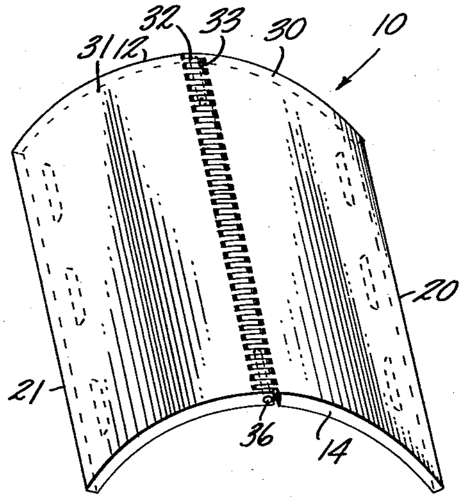
Figure 5 is a view in perspective showing a modification of a base plate according to the invention.
Figure 6:
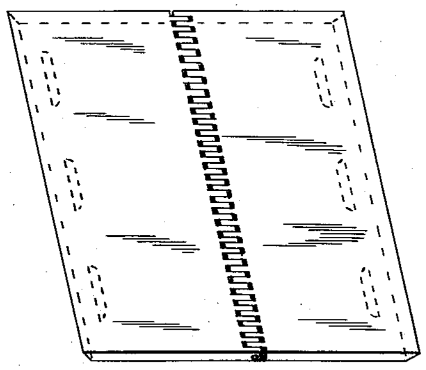
Figure 6 is a view in perspective of a base plate similar to that shown in Figure 5 but adapted for mounting on a flat bed type of printing press.

The base plate 10 may be discontinuous by forming two solid sections 30 and 31, Figure 5, connected by interlocking comb elements 32 and 33. It is preferred that these comb elements 32 and 33 be located along a line approximately midway between the edges 20 and 21, although they may be located otherwise if desired. Also, a base plate constructed in this manner may be adapted for attachment to a flat bed type printing press as shown in Figure 6.

Figure 7:
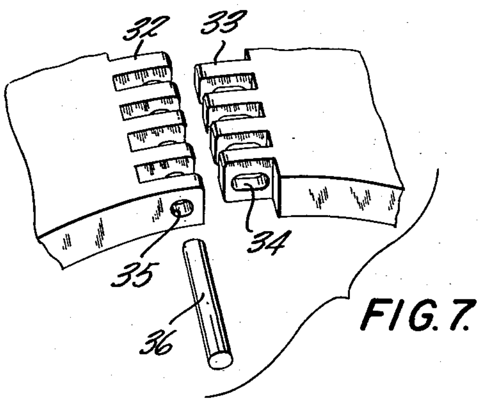
Figure 7 is an enlarged perspective view of a part of Figure 5 illustrating the connection between the discontinuous sections of the base plate.

To permit the edges 20 and 21 to be movable relative to each other, the comb elements 33, as seen in Figure 7, are provided with elongated apertures 34, as contrasted with the substantially circular apertures 35 in the comb elements 32. A pin 36 of sufficient length to pass through only approximately 4 or 5 of the interlocking comb elements adjacent each of the ends 12 and 14 serves to interconnect the two solid sections 30 and 31.

Figure 8:
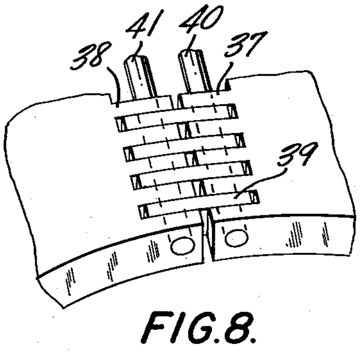
Figure 8 is a view in perspective of a modification of the connection shown in Figure 7.
Figure 9:
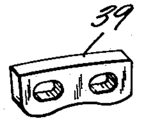
Figure 9 is a view in perspective of one link which forms one of the coupling elements in the modification shown in Figure 8.

An alternative to this arrangement is shown in Figures 8 and 9 of the drawings. The comb elements 37 and 38 are formed to fit substantially in abutting relationship, and a plurality of coupling links 39 in conjunction with pins 40 and 41 provided the connection between the two solid sections of the base plate. In this arrangement, it is preferred that the pins 40 and 41 extend across the entire width of the base plate. As shown in Figure 9, both apertures in each coupling link 39 are elongated to permit relative movement between the two sections of the base plate.

Figure 10:
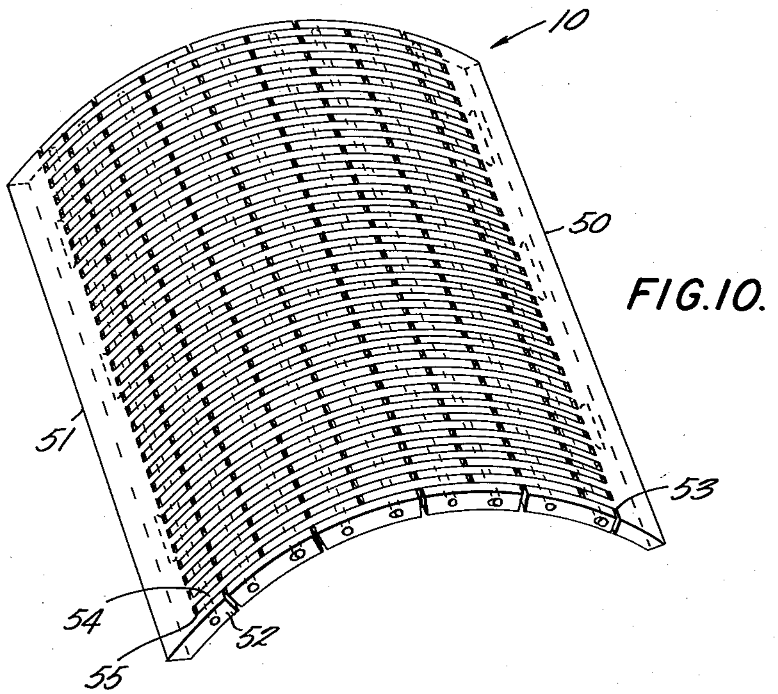
Figure 10 is a view in perspective of a further modification of a base plate according to the invention.
Figure 12:
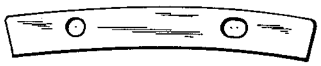
Figure 12 is a view of one of the links shown in Figure 10 for mounting on a cylinder of predetermined curvature.

Another modification of the base plate 10 according to the invention is shown in Figure 10. In this form, the base plate 10 is provided with solid sections along the edges 50 and 51, and these solid sections are connected by a plurality of coupling links. One of these linking elements is shown in Figure 12 as having the longer surfaces curved a predetermined amount to conform to the surface of a cylinder on a printing press.

Figure 13:
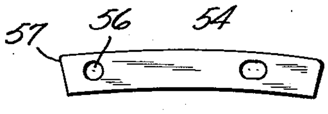
Figure 13 is a view of another of the links shown in Figure 10.

The various coupling links are interconnected in a chain-like fashion as, for example, from the end of the comb element 52 to a recess 53. In certain instances, one group of coupling links may be shorter than the others in the chain. One such coupling link 54, fitting within recess 55, is shown in Figure 13 of the drawings. The radius of curvature of this coupling link 54 is the same as the radius of curvature of the coupling link shown in Figure 12, the principal difference being that the distance between the aperture 56 and the end 57 is shorter.

Figure 11:
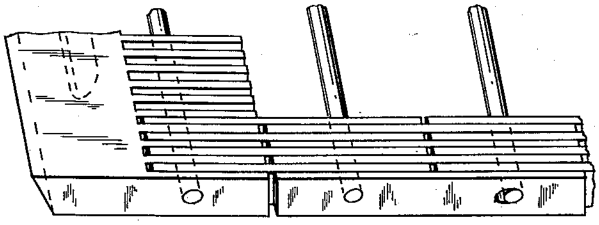
Figure 11 is a perspective view of part of a base plate similar to that shown in Figure 10 but adapted for mounting on a flat bed type of printing press.
Figure 14:
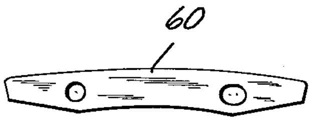
Figure 14 shows a modification of the link shown in Figure 12 to permit the base plate shown in Figure 10 to be mounted on a cylinder of another diameter.
Figure 15:
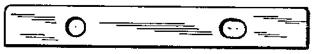
Figure 15 is a view of a link in the base plate shown in Figure 11.

A coupling link 60 is shown in Figure 14 to illustrate a form which may be provided to permit the base plate to fit various diameters of cylinders for rotary type printing presses. A further form of connecting link is shown in Figure 15 and is illustrated more particularly in the arrangement shown in Figure 11 to permit the base plate to be mounted on a flat bed type of printing press. The particular number of coupling links shown in Figure 10 is merely for illustrative purposes and in no way limits the invention.

While the forms of the base plate herein described constitute preferred embodiments of the invention, it is to be understood that the invention is not limited to these precise forms and that changes may be made therein without departing from the scope of the invention which is defined in the appended claims.

I claim:

1. An expandable base plate for attaching a relatively stiff plate having downwardly turned ends to a printing press, said base plate being defined by a lower surface adapted to be received on a printing press, an upper surface for receiving the printing plate and leading and trailing and side ends, comprising leading and trailing sections and means connecting the leading and trailing sections for relative movement to permit the base plate to be lengthened and shortened between the leading and trailing ends, the lengthening of the base plate bringing the leading and trailing ends thereof into locking engagement with the downwardly turned ends of the printing plate and the shortening of the base plate freeing the printing plate from the base plate.

2. In a printing press the combination of a relatively stiff carrier for a printing plate having downwardly turned opposite ends, an expandable base plate underlying and supporting the carrier, a support for the base plate, means defining recesses in the underside of the base plate and plate clamps carried by the base plate support, said plate clamps moving in opposite directions to clamp the base plate to its support, said expandable base plate comprising leading and trailing sections and means connecting the leading and trailing sections for relative movement, permitting the lockup movement of the plate clamps to expand the base plate and bring the leading and trailing edges of the base plate into clamping engagement with the downwardly turned ends of the carrier.

3. A base plate for attaching a printing plate to a press with a uniformly distributed force comprising a base plate having opposite edges, a first plurality of slots spaced apart along the surface of the base plate and opening at one end of the base plate, a second plurality of slots intermediate the first plurality and opening at the opposite end, the slots in both the first and second pluralities being completely through the thickness of the base plate, means adjacent the opposite edges to attach the base plate to a press, and means to mount a printing plate on the base plate.

4. A base plate for attaching a printing plate to a press with a uniformly distributed force comprising a base plate having opposite edges, each of the opposite edges being beveled at an angle with a plane perpendicular to the surface of the base plate, a slot in the base plate extending from a point adjacent one end and opening at the opposite end, another slot in the base plate extending from a point adjacent said opposite end and opening at said one end, each of the slots being completely through the base plate, and means to attach the base plate to a press.

5. A base plate for attaching a printing plate to a press with a uniformly distributed force comprising a base plate having two solid sections, each solid section having comb elements along one edge and a substantially uniform opposite edge, at least some of the comb elements in one of the sections having an aperture therein, at least some of the comb elements in the other solid section having elongated apertures therein, means to connect only selected comb elements in both solid sections to form a unitary base plate so that the opposite edges are movable angularly relative to each other, and means to mount the base plate to a press.

6. A base plate for attaching a printing plate to a press with a uniformly distributed force comprising a base plate having two solid sections, each of the sections having comb elements along one edge and having a substantially uniform opposite edge, the comb elements of the two sections being formed to fit together in abutting relation, a coupling link adapted to fit between each of the abutting comb elements, means to movably attach each coupling link to the comb elements, and means to attach the base plate to a press.

7. A base plate for attaching a printing plate to a press with a uniformly distributed force comprising two solid sections spaced apart from each other, each section having a relatively smooth edge along one side and a plurality of comb-like elements along the opposite side, a plurality of interconnected chain-like coupling links flexibly connecting the two sections to form a unitary base plate and means to attach the base plate to a press.

8. A base plate as set forth in claim 7 wherein each of the coupling links has a radius of curvature conforming substantially with the curvature of a printing cylinder.

References Cited in the file of this patent

UNITED STATES PATENTS

| | | |
|---|---|---|
| 676,010 | Simpson | June 11, 1901 |
| 1,240,315 | Chrisman | Sept. 18, 1917 |
| 1,674,635 | Burden | June 26, 1928 |
| 1,881,075 | Gutmann | Oct. 4, 1932 |
| 1,980,386 | Davis | Nov. 13, 1934 |
| 2,108,822 | Lippencott | Feb. 22, 1938 |
| 2,176,595 | Panier | Oct. 17, 1939 |
| 2,261,305 | Stephenson | Nov. 4, 1941 |
| 2,285,116 | Grupe | June 2, 1942 |
| 2,664,821 | Huffman | Jan. 5, 1954 |
| 2,668,497 | McWhorter | Feb. 9, 1954 |
| 2,831,428 | Dahlberg | Apr. 22, 1958 |

FOREIGN PATENTS

| | | |
|---|---|---|
| 529,809 | Great Britain | Nov. 28, 1940 |